United States Patent
Buzzi

[11] 3,797,081
[45] Mar. 19, 1974

[54] MACHINE FOR THE AUTOMATIC HIGH-SPEED, HIGH PRECISION MACHINING OF SMALL PARTS, EVEN THOSE HAVING A COMPLICATED FORM

[75] Inventor: Ugo Buzzi, Agno, Switzerland
[73] Assignee: Albe S.A., Lugano, Switzerland
[22] Filed: Dec. 22, 1971
[21] Appl. No.: 210,808

[30] Foreign Application Priority Data
Sept. 30, 1971 Switzerland.................... 14281/71

[52] U.S. Cl. .................................. 29/38 C, 408/45
[51] Int. Cl. ............................................ B23p 23/00
[58] Field of Search............... 29/33 J, 38 C; 408/45

[56] References Cited
UNITED STATES PATENTS
3,304,596  2/1967  Weidauer........................... 29/38 C
2,429,938  10/1947  Mansfield........................... 29/38 C
2,216,141  10/1940  Sinclair............................... 29/38 C
2,318,619  11/1943  Noel................................... 29/38 C Primary Examiner—Francis S. Husar

[57] ABSTRACT

A machine for automatic, high-speed, high precision machining of small parts comprising a piece holding turntable having an intermittent rotary movement for transporting each piece from one work station to the next and a plurality of interchangeable work units having at least one drive motor to advance the tool and at least one motor for the rotation of the work movement of the tool, each unit being placed in correspondence with a work station and being able to carry out different machining operations simultaneously as the pieces arrive at the station.

2 Claims, 13 Drawing Figures

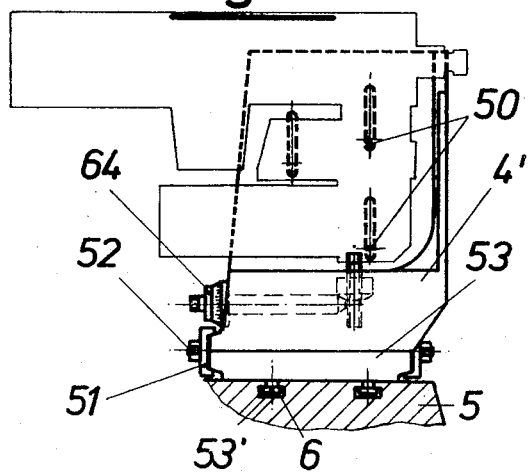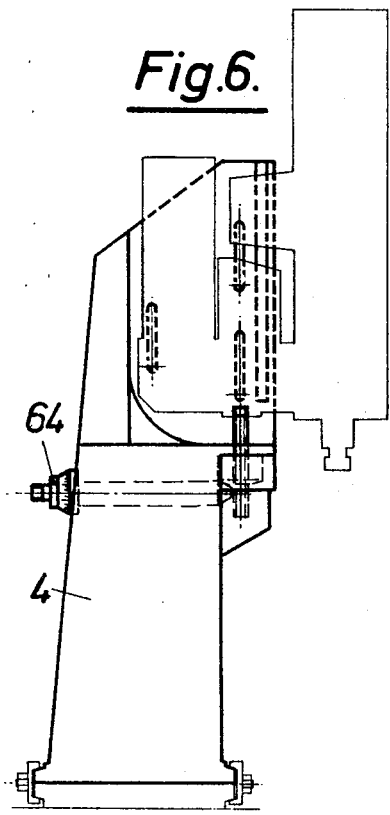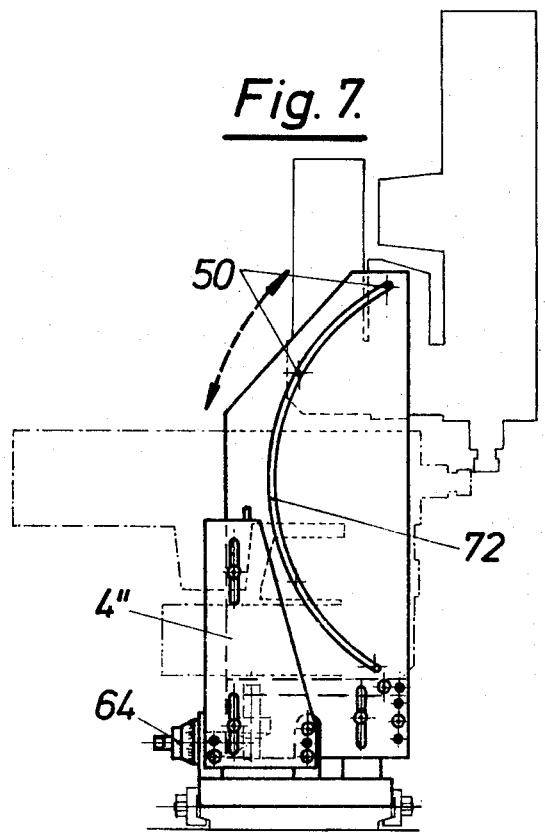

MACHINE FOR THE AUTOMATIC HIGH-SPEED, HIGH PRECISION MACHINING OF SMALL PARTS, EVEN THOSE HAVING A COMPLICATED FORM

The present invention is directed to a machine for the automatic, high-speed, high precision, machining of small parts, especially those having a complicated form, such as electrical contacts, parts or pieces having similar or different holes, millings, or threads.

The machine, comprises a piece holding turntable, having an intermittent rotary movement for transporting each piece from one work-station to the next one, and a plurality of work units, each placed in correspondence with a station, and each to carry out simultaneously on the pieces which are presented to it as they arrive, different machining operations, is characterized by the fact that:

said work units are of one single type, standardized and autonomous and therefore interchangeable from one station to another;

each work unit has at least one electric driving motor for advancing of the tool to the piece at the work station and at least one electric command motor for powering the work movement of the tool, said command motor being removably attached to the tool; the movement of the various motors being mechanically independent of the intermittent movement of the piece holding table;

the speed of the various electric motors on all the units are simultaneously variable by means of a single control;

the synchronism of the various operations, which might otherwise be altered by slight differences in the speed of the various motors, can be ensured by restoring the phase setting at the beginning of each work operation.

The enclosed drawings represent a preferred, non-limitative realization of the machine according to the present invention:

FIG. 5 represents a work unit fixed onto a support for horizontal machining;

FIG. 6 represents a work unit fixed onto a support for vertical machining;

FIG. 7 represents a work unit fixed onto a support for inclined machining;

Figure 1:
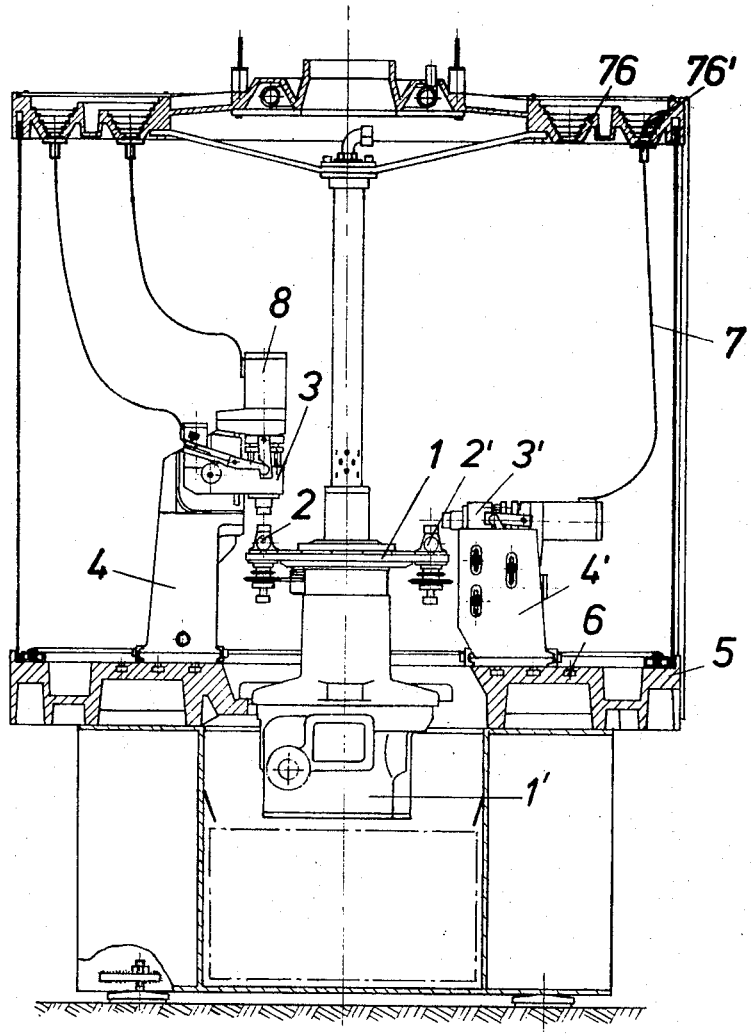
FIG. 1 is a schematic axial section of the machine of the invention.
Figure 9:
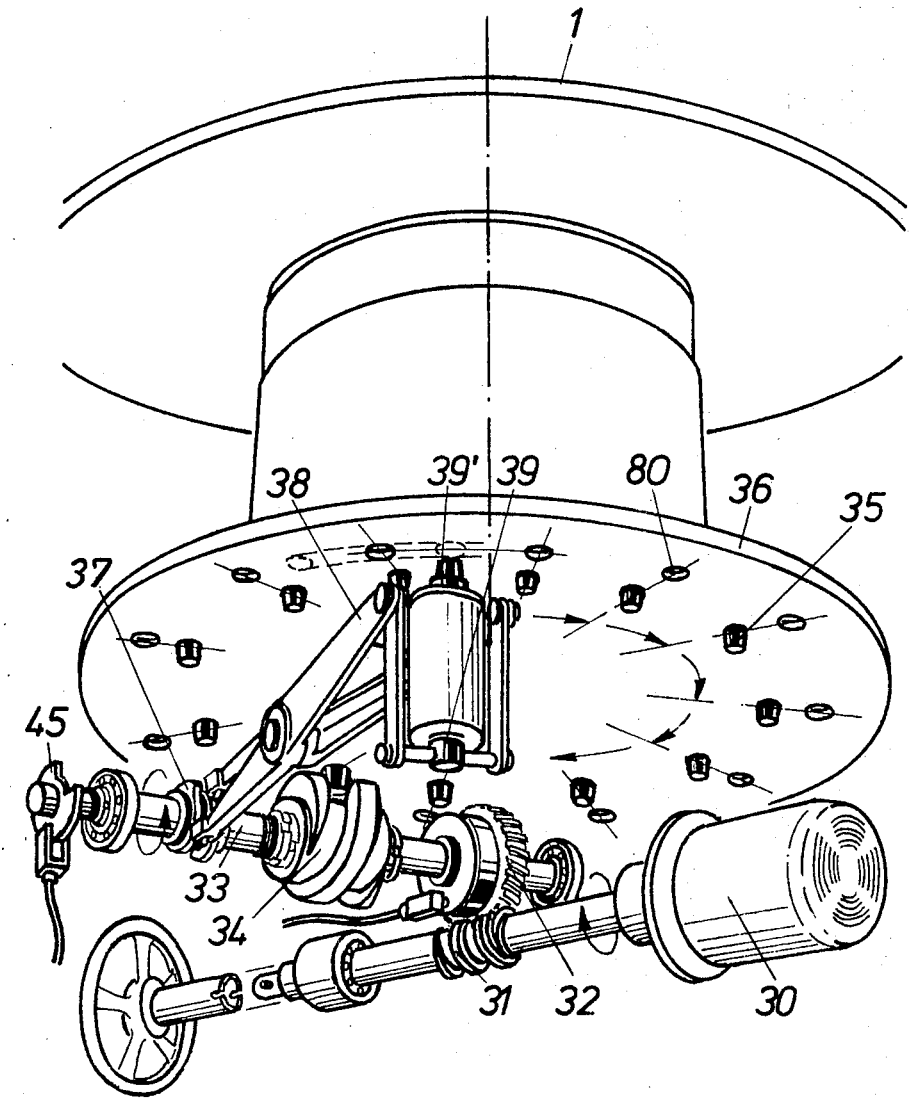
FIG. 9 represents a perspective view of the mechanism operating the rotation of the piece holding turn table.

The machine comprises essentially (see FIGS. 1 and 9) a piece holding table 1 having a rotating intermittent motion, bearing at equal regular distances of its periphery a certain number of piece holding grippers 2—2'.

If, for example, the piece holding table has 12 grippers distributed uniformly at its periphery each one at an angular interval of 30°, there will be the same number (that is twelve) of work stations. There is a work unit 3, 3', etc., inside each station, fixed on a support 4, 4' etc., and each one of these units carries out a specific machining on the work piece.

It is obvious that while the work unit 3 is carrying out a specific machining on the corresponding piece, for example a drilling operation, at the same time the following successive work unit carries out another machining, for example, a screwing operation, so that at the same time at each step of the turn table 1, the various pieces undergo successive machinings and at each revolution of the piece holding table 1 of a raw or crude piece enters and a finished one comes out.

The lower part 1' of the piece holding table contains all the kinematics, that is all the mechanism (FIG. 9) necessary to transmit to it the intermittent motion, including the electric motor.

The frame of the machine bears the fixed platform 5 (FIG. 1) having annular grooves, 6 onto which the units are mounted in correspondence with the single work stations.

The upper part 76 of the machine is made of synthetic insulating material constituting of a cover containing the current distributing system for the various motors.

In the cover 76 are provided channels into which are inserted conductors, that is circular bars for the distribution of the current to the sockets into which are fitted the plugs joined to the conductors which feed the various motors. Conductors are provided for the feeding of the servomotors 11 (FIG. 2) and also power operated spindles 8 holding the tools, which can be of different types according to the power and the working speed.

Said tool holding motor spindles 8 are removable with the tool from their respective seats in order to provide more easily for the replacement of the tool.

A first new characteristic of the machine according to the present invention is constituted by the fact that the various work units 3, 3', etc., are of one standard and independent type and are therefore interchangeable from one station to another.

A second characteristic consists of the fact that each work unit 3, 3', etc., has (FIG. 2) electric drive motors 11 and 8; the first 11 also called servomotors, able to control the feed movement of the tool, the second 8 being able to control the machining carried out by the tool on the same unit. Motors 11 and 8 are operated independently of the intermittent mechanical feed motion of the piece holding table 1. In other words there is complete independence of the intermittent movement of the piece holding table 1 and the feed motion and machining of the tool carried by each work unit, and there is no mechanical restraint between the two.

Furthermore, there is no mechanical restraint between the tool-holding spindle and the servomotor 11 which controls the feed motion.

An essential characteristic of the machine according to the invention is constituted by the fact that the speeds of the servomotors 11 carried by the various units 3 and 3' are simultaneously variable by means of a single control.

The above mentioned motors 8 and 11 can be, for example, of the alternating current type, that is asynchronous or eventually also synchronous, or of a direct current type. In the former case (asynchronous or synchronous motors) the variations of their speeds is determined by varying the frequency of the alternating current which feeds them.

In this case the machine is provided with a suitable variable frequency alternating-current generator which can simultaneously feed all the motors 11 and 8 of the various work units (3, 3' etc.). By varying the frequency, one varies the speed of the said motors and therefore one varies the whole machining time of the machine, and one increases or reduces the machining time of the machine itself.

In case one should use asynchronous motors which present a sliding of the rotor with respect to the stator and therefore a slight variation of the speed, it is foreseen that at the end of a working operation the synchronism of various machining must be reestablished by restoring the phase setting, as will now be described in more details.

For direct current motors the speed is varied by varying the voltage applied.

There now follows a detailed description of the realization of the work unit with reference to the drawings 2, 3 and 4.

The work unit (FIG. 2) is composed of a small block 3 in which is incorporated the feed system of the tool holding motor spindle 8 which runs on balls in the hole of the bush 9. The power operated spindle holding the tools is easily removable from the block and thus from the tool, by sliding the levers 10 in order to permit the rapid change of the tool.

The block 3 can be fixed on various different supports 4, 4', 4'' etc. (FIGS. 5, 6, 7) according to the machining to be carried out, as we will describe further on. The feed device of the motor spindle 8 consists of a motor 11 (FIG. 2) (which we will call servomotor) which transmits the movement, through the worm screw 12 and the nut 13 to the camshaft 14 (FIG. 3).

Figure 2:
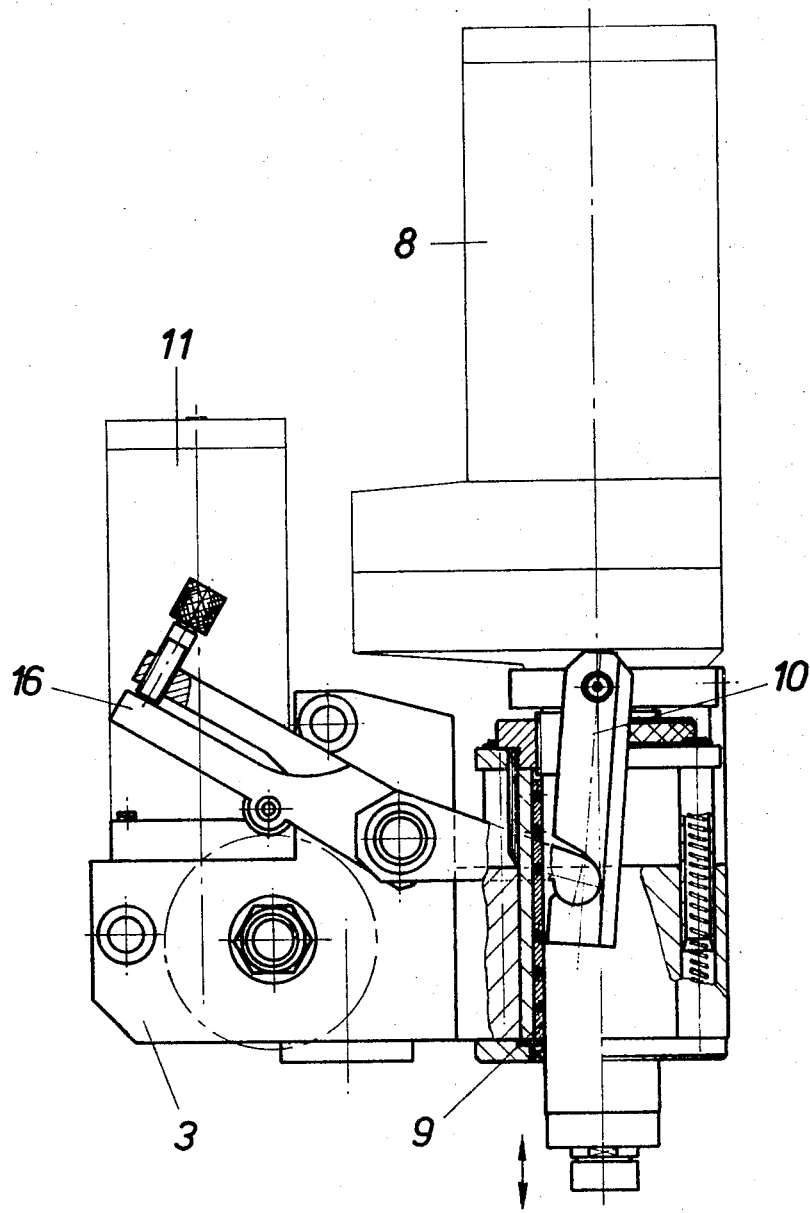
FIG. 2 represents a lateral view partially sectioned of a work unit on a larger scale.
Figure 3:
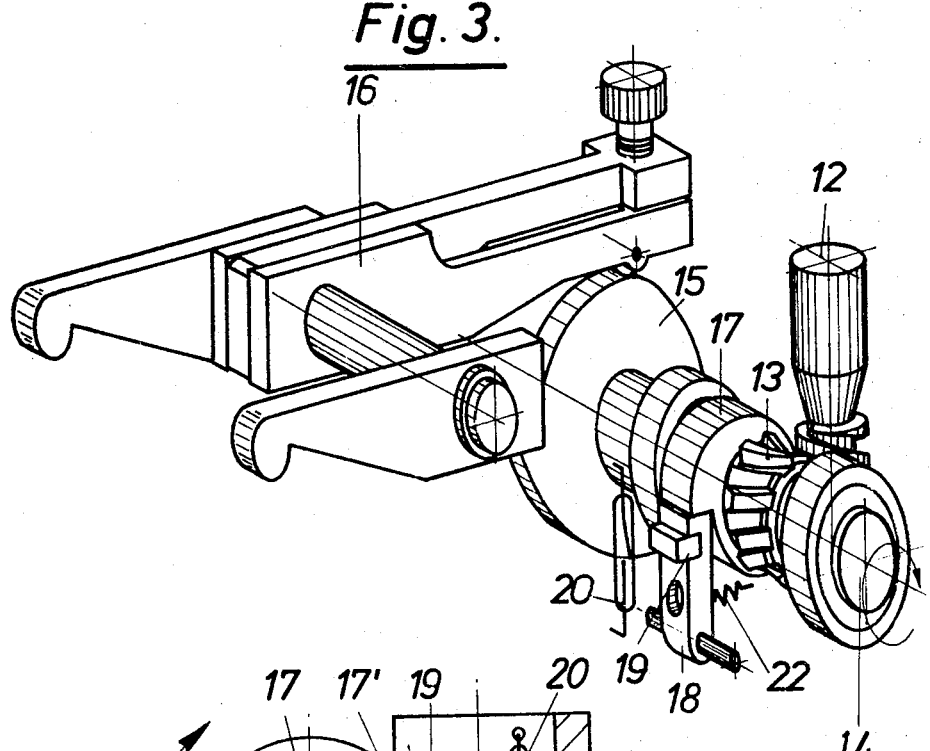
FIG. 3 represents a perspective view of a detail of the work unit.

The cam 15 then transmits by a system of levers 16 the movement to the motor spindle 8 (FIG. 2).

In order to vary the machining time, as already mentioned, it is necessary to vary the speed of rotation of the servomotor 11.

It is further necessary to take into account the fact that the different units placed in correspondence with the different "stations" of work must work "synchronously," that is, all the cams 15 of the different work units must carry out one turn at the same time. A small error is acceptable; the error itself however must not accumulate over several machinings, since otherwise the synchronism between the units themselves would be lost. This happens particularly when the electric servomotors 11 are synchronous.

The speed of the servomotors 11 if of alternatingcurrent, is varied, as has been already mentioned, by varying the frequency of the feed current.

The variable frequency is delivered by a known type of static generator of frequencies (not shown), which combines two frequencies, a main frequency and one generated separately, and permits infinite variation of the resulting frequency and as a consequence infinite variation of the speed and machining times of the machine. The frequency generator feeds all the servomotors 11.

Figure 4:
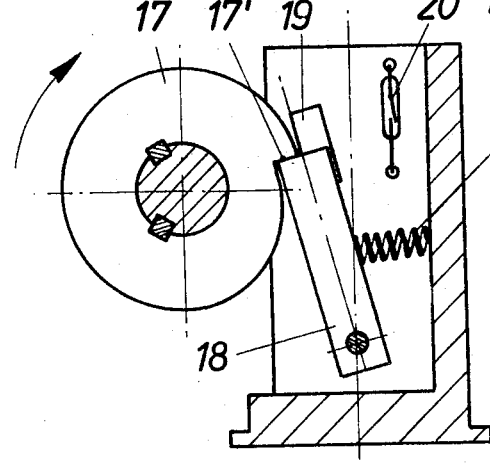
FIG. 4 represents a cross section view of the same unit illustrated in FIG. 3.

The servomotors, as said, are three-phase asynchronous motors and though they are fed from the same generator it is clear that their rotation is not completely synchronous. In fact there will be slight differences due to the different loads (according to the machining to be carried out in correspondence with one station) and friction, etc. For this reason there has been incorporated into the block 3 of each unit, a system for the phase setting of all the units, which functions as follows:

On the camshaft 14 (FIG. 3) (which obviously carries out one rotation for each machining) there is fixed a cam 17 on which the lever 18 comes to rest. The cam 17 has, at point "0" (which corresponds to the end of the machining), a shoulder 17' (FIG. 4).

During the rotation of the shaft 14 when the shoulder 17' comes to point "0," the lever 18 which is preloaded by the spring 22 moves, and by means of the magnet 19 opens the "reed" contact 20 (a known type of contact consisting of two blades one of which is magnetic and is worked by an electromagnet or magnet). A signal which marks the end of the work machining for each unit is thus obtained. When the contacts 20 of all the work units are open, this means that all the units situated at the various stations have reached point "0," that is, the end of their machining.

Obviously, given the possible asynchronism, there will be small differences, in time when this "0" point is reached. That is, not all the contacts will open at exactly the same instant. The frequency of the current feeding the servomotors 11 must therefore be brought rapidly to zero and the relative phase inverted.

This is obtained by superimposing as has already been mentioned, two component frequencies the main frequency and a separately generated one, and acting in such a way that the result of the two former are annuled and then the phase is inverted.

The servomotors 11 are, as a consequence, first rapidly braked and subsequently inverted in the direction of their rotation.

The negative rotation (in an inverse sense) is limited to the shoulder 17' of the cam 17 which blocks the shaft 14 and then the respective servomotor 11.

The step movement of the piece holding table 1 (FIG. 1) begins as soon as all the work units arrive at "0" (reed contacts open).

During the time in which the part carrying table 1 moves one step, the servomotors 11 are braked and subsequently, by means of negative rotation, they are set in phase for the next machining.

In other words, the servomotors 11 which have had a greater forward movement than the others have time to return to "0" by means of the inverse rotation. No time is therefore lost for the synchronisation.

In the case in which direct current motors are used, the speed variation is obtained by varying the feed voltage and the inversion of movement is carried out by reducing such feed voltage to zero and inverting it.

The various work units 3, 3' can be fixed onto three different supports, namely on a support 4' (FIG. 5) for horizontal machinings; on a support 4 for vertical machinings (FIG. 6); on a support 4'' (FIG. 7) provided with semi-circular vertical grooves 72 which permit inclined machinings according to angles between the vertical and the horizontal.

The fixing of the work units 3, 3' etc., on respective supports 4, 4', 4'' is obtained by the use of the nuts 50 (FIG. 5).

Figure 8:
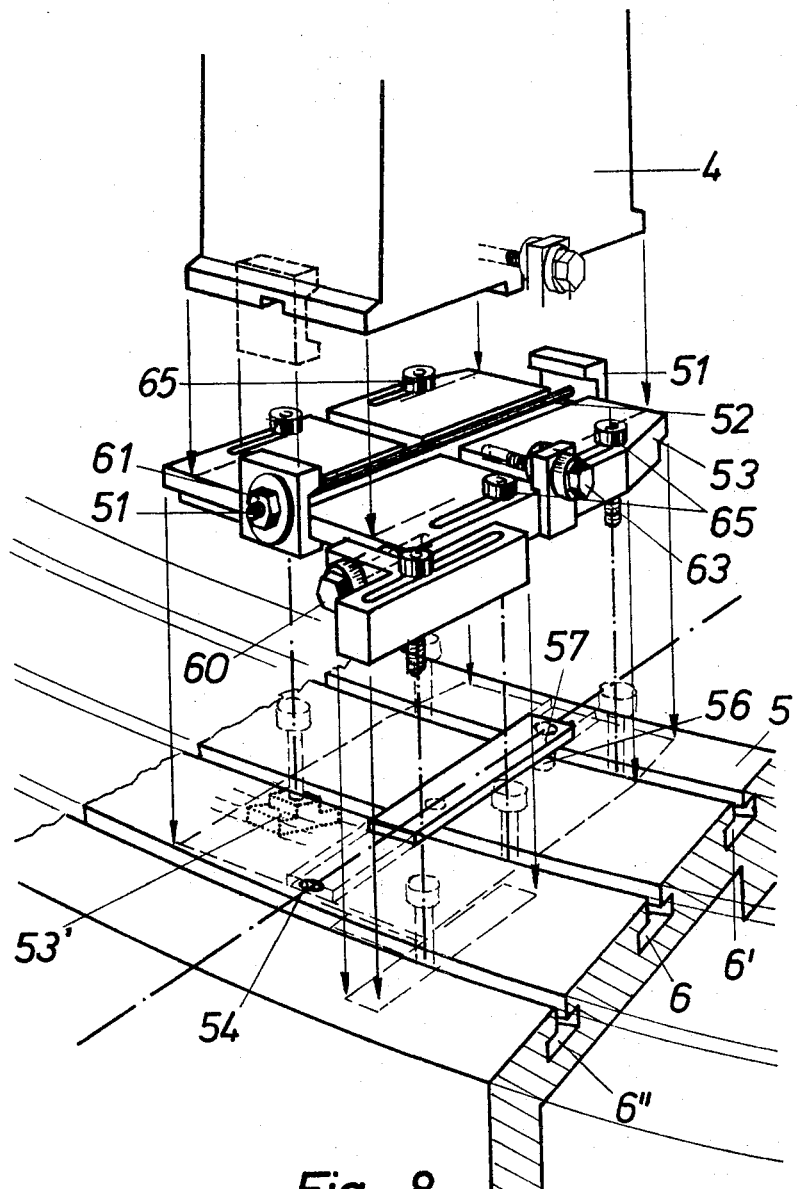
FIG. 8 represents an exploded perspective view of the particulars regarding the fixing of a work unit to the platform or table integral with the frame of the machine.

The supports 4, 4', 4'' are fixed by means of stirrups 51 (FIGS. 5 and 8) and tie rods 52 to the intermediate plate 53. The said intermediate plate 53 is, finally, fixed to the fixed platform 5 (FIGS. 1, 5, 8) by means of clamps 53' (FIGS. 5 and 8) which in their turn insert into T-slots 6 of the platform 5. On the platform 5 there are holes 54 (FIG. 8) in correspondence with each station.

There can be fixed into these holes, by means of pins or plugs 56, rods 57 which act as leads guides to the intermediate plate 53 and facilitate the regulation of the work unit 3' placed above, in particular for radial machinings, that is machinings whose axis is turned towards the centre of the machine. For machining operations whose direction is not facing towards the centre of the machine, the rods 57 can be removed and the supports 4, 4', 4'' of the work units 3, 3', 3'' etc., can be fixed in any direction on the platform 5.

As can be seen from the drawing, the platform 5 has three T-slots indicated by 6. This allows the fixing of the intermediate plate 53 not only in the two middle and internal slots 6, 6', but also in the two middle and external slots 6, 6'' thus allowing a much larger working field.

Thus each work unit can be moved and controlled: in a "radial" direction, that is towards the centre of the machine, by slightly loosening the four fixing screws 65 (FIG. 8) of the base plate 53 and acting upon the radial macrometrical screw 60; in the "lateral" (tangential) direction by loosening the nut 61 of the tie-rod- 52 and acting of the micrometric screw 63 (relative movement between plate and support); in "height" loosening the three nuts 50 (FIG. 5) and acting on the micrometric screw 64 (FIG. 6).

As regards the rotation movements of the turntable 1 (FIG. 1), the motor 30 (FIG. 9) controls by means of the worm screw 31 and the gear 32 the shaft 33. On the shaft 33 is fixed the cam 34, which is in the form of a worm.

The cam 34 acts on the rollers 35 fixed on the disc 36 integral and coaxial to the turntable 1. At each turn of the shaft 33 the cam 34 produces a displacement of the turntable equal to the pitch of the cam 34. The form of the cam 34 is such as to produce the movement of the turntable 1 by a fraction of a turn with constant acceleration and deceleration. The cam 37 also integral with the shaft 33 controls, by means of the lever 38, the piston 39 whose conical extremity 39' after each movement (fraction of turn) of the table 1 is introduced into the complementary conical hole 80 and thus exactly fixes the position of the turntable itself. In other words, a part of the angular movement of the shaft 33 during a turn of the shaft itself is used to control the rotation of the table 1, the remaining angular part for the indexing, that is the exact fixing of the table 1 in the position reached.

Figure 10:
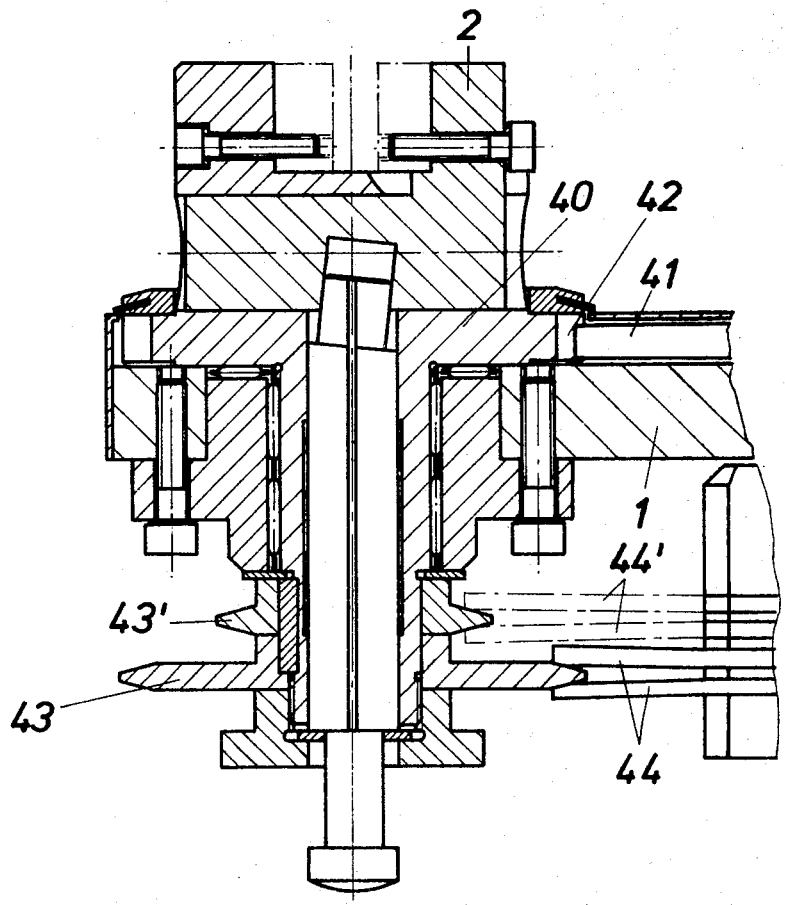
FIG. 10 represents in cross section the mechanism for the rotation of the grippers which grasp the piece to be machined.

In the drawings 10 and 11 the mechanism for the rotation of the self-centering grippers which grasp the piece to be machined is shown. The piece holding table 1 has a plurality of pans or plates 40 bearing the grippers 2 (in FIG. 10 is shown an example of a pair of grippers 2, but in the same holding pan 40 it is possible to provide other systems of grippers). The pans 40 can be rotated by a certain angle passing from one work station to another and this simultaneously to the angular movement of the piece holding table 1.

Figure 11:
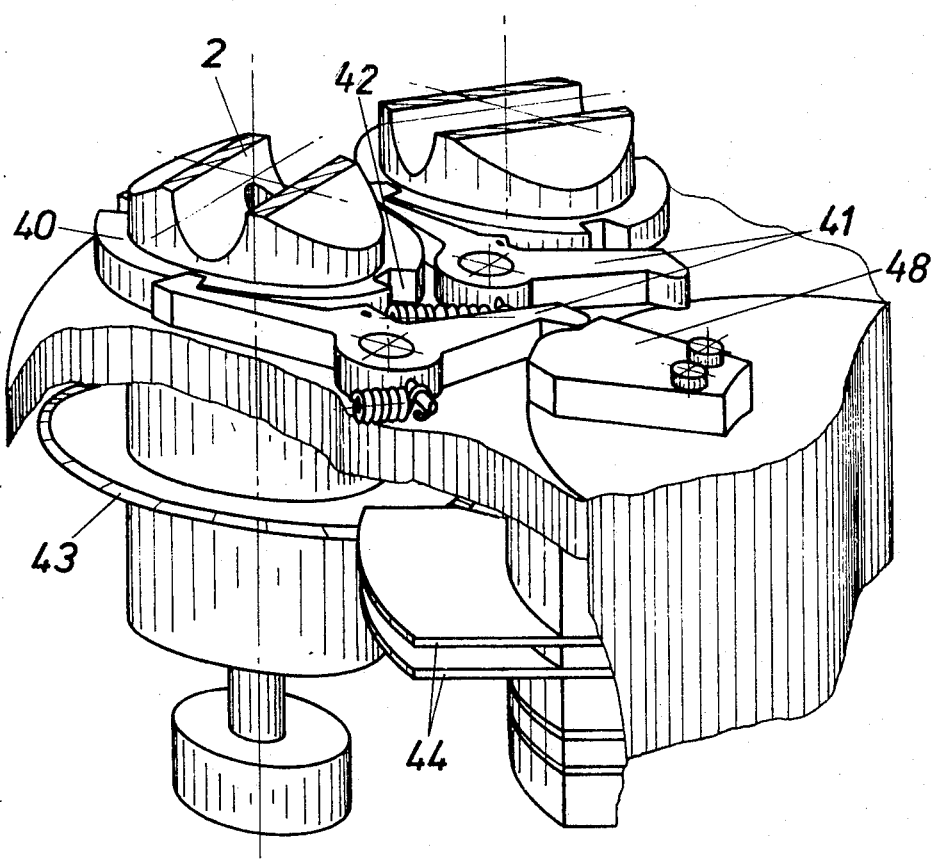
FIG. 11 represents a perspective view of the same mechanism.

During the machining time each pincer holding pan 40 is held fixedly by its respective anchoring lever 41 (FIG. 11) which with its tapered extremity penetrates into the complementary cavity 42 of the pan itself; said lever 41 rests at its other extremity on the cam 48 shaped in such a way that when the piece carrying table 1 begins to move, the freeing of the lever 41 from the cavity 42 occurs, thus freeing the pan 40 of each unit. At the same time the disc 43, integral to the axis of the holding pan 40 comes into contact with the elastic blades 44, fixed to the frame which holds the table 1 and by friction causes the rotation of the pan 40.

The lever 41 which had previously freed the pan 40, before the end of one movement of the table 1 again stops the same pan in the desired position.

In one and the same carrying pan can be fixed more discs 43 of different diameters shown in 43' (FIG. 10) and which comes into contact with blades 44' moved vertically with respect to the blades 44. It is thus possible to obtain different rotation ratios of the pan 40- In this manner it is possible to make the rotation of the pan perfect, in the sense that changing the ratios according to the angle of rotation required it is possible to begin or terminate the rotation of the pan 40 always at the beginning and at the end of the movement of the table 1, that is, when the moving speed of the table 1 is practically zero.

Furthermore it is possible to be able to rotate a gripper through a certain angle (for example 90°) between one work position and another and through another angle (for example 180°) between another work position and the successive one.

Figure 12:
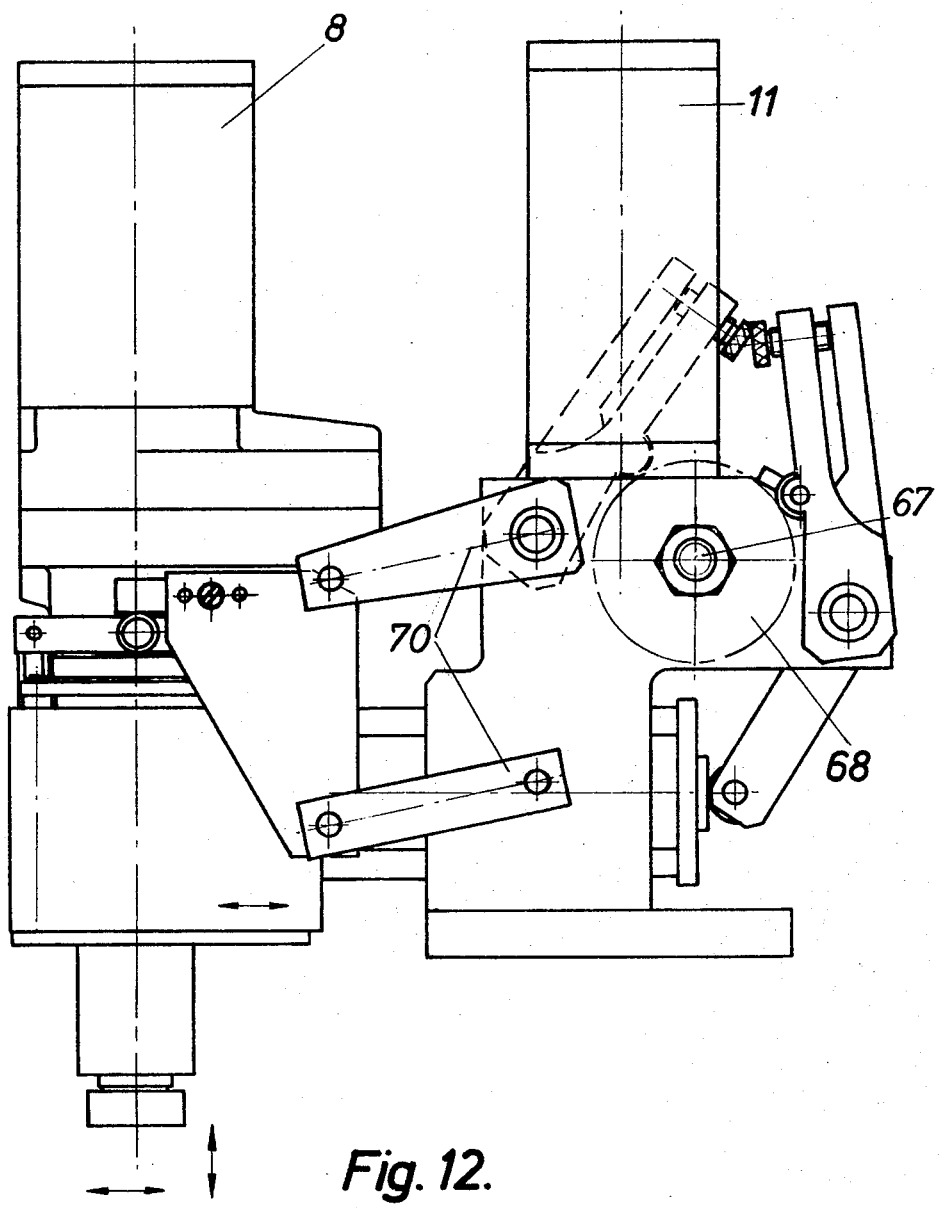
FIG. 12 represents different embodiment of the work unit.

Another type of work unit is represented in FIG. 12. It enables the imposing on the spindle of the tool holders two movements, one vertical and one horizontal.

The horizontal and vertical movements are controlled by two cams 68 integral to the same axis 67 of a servomotor 11 as for the work unit illustrate in FIG. 2.

The vertical movement is transmitted to the spindle through parallelogram leverage 70 in such a way that this movement is independent of the horizontal movement.

The parallelogram allows the motor to be moved vertically by means of a cam independently of the position in which it is to be found.

Figure 13:
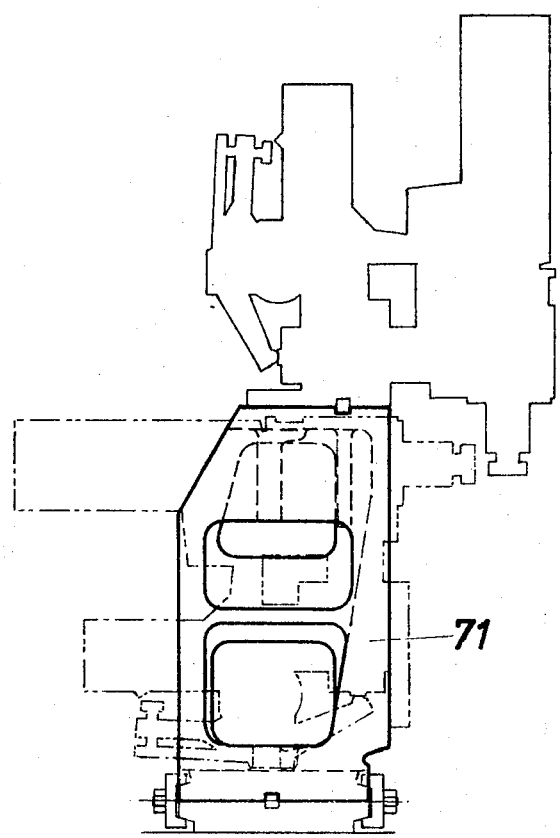
FIG. 13 represents a support which permits the simultaneous holding of two work units at a single station.

Finally, in FIG. 13 there is provided a support 71 which allows two work units to be held and as a consequence enables two operations to be carried out (one in a horizontal position and the other in a vertical one) simultaneously at the same station.

As regards the general working of the machine, and in particular the synchronisation of the work units with the control of the piece holding turntable 1, the following is to be made clear: when all the work units arrive at point "0," the motor 30 (FIG. 9) which controls the rotation of the turntable is switched on and the shaft 33 carries out a rotation. A contact 45 gives the position "0" of the shaft 33. When the rotation has finished, the work units are synchronized, and are ready to receive the command to carry out a work cycle, and so on.

I claim:

1. In a machine for the automatic, high-speed, high-precision machining of small parts of complicated form, comprising a piece-holding table; a plurality of work stations around said table; means for intermittently rotating said table to transport each piece from one work station to the next; and a plurality of work units, each in correspondence with a work station and each operable to carry out simultaneously on the pieces which are presented to them a different machining operation, said work units being of a single type and interchangeable from one work station to another; each work unit having a tool, a feeding means for moving said tool from an initial starting position to a position where the tool works on said piece transported to said work station, said feeding means being powered by an electric feed motor, an electric command motor for supplying power to the tool, said command motor being removably attached to the tool, the feeding movement of the tool being mechanically independent of the intermittent movement of the piece-holding table, the improvement which comprises:
   a. a single control means for simultaneously varying the speed of the electric feed motors,
   b. resetting means for resetting all of the tools to said initial starting positions at the end of each machining operation comprising brake means for braking said feed motors at the end of each machining operation, reversing means for rotating the feed motors in a reverse direction after operation of said brake means and stop means for stopping the reverse rotation of said feed motors when said feed motors have moved said tools to said initial starting positions; and
   c. means for starting all of said feed motors at the same time after all of the tools are reset to said initial starting positions.

2. The machine according to claim 1, wherein said stop means comprises a cam rotated by said feed motor and electric switch means operated by said cam to stop said reverse rotation of said feed motor when the tool is moved to said initial starting position.

* * * * *